(12) United States Patent
Park et al.

(10) Patent No.: US 11,153,498 B2
(45) Date of Patent: Oct. 19, 2021

(54) IMAGE PROCESSING METHOD AND ELECTRONIC DEVICE SUPPORTING SAME

(71) Applicant: Samsung Electronics Co., Ltd., Gyeonggi-do (KR)

(72) Inventors: Byeong Chan Park, Gyeonggi-do (KR); Min Soo Kim, Gyeonggi-do (KR); In Koo Kang, Gyeonggi-do (KR); Jong Hoon Won, Gyeonggi-do (KR); Kwang Tai Kim, Gyeonggi-do (KR); Dong Hyun Yeom, Gyeonggi-do (KR); Ki Huk Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/473,124

(22) PCT Filed: Dec. 21, 2017

(86) PCT No.: PCT/KR2017/015223
§ 371 (c)(1),
(2) Date: Jun. 24, 2019

(87) PCT Pub. No.: WO2018/117681
PCT Pub. Date: Jun. 28, 2018

(65) Prior Publication Data
US 2019/0364186 A1     Nov. 28, 2019

(30) Foreign Application Priority Data

Dec. 23, 2016 (KR) .......................... 10-2016-0178381

(51) Int. Cl.
*H04N 5/225* (2006.01)
*H04N 5/235* (2006.01)
(Continued)

(52) U.S. Cl.
CPC ............. *H04N 5/235* (2013.01); *H04N 5/147* (2013.01); *H04N 5/23212* (2013.01); *H04N 5/36961* (2018.08); *G06T 2207/10144* (2013.01)

(58) Field of Classification Search
CPC ................................................. H04N 5/232133
See application file for complete search history.

(56) References Cited

U.S. PATENT DOCUMENTS 8,494,306 B2   7/2013   Sorek et al.
8,786,750 B2   7/2014   Kameyama et al.
(Continued)

FOREIGN PATENT DOCUMENTS

JP     2012235232    11/2012
KR   1020100060095    6/2010
(Continued)

OTHER PUBLICATIONS

PCT/ISA/210 Search Report issued on PCT/KR2017/015223, p. 5.
PCT/ISA/237 Written Opinion issued on PCT/KR2017/015223, p. 8.

*Primary Examiner* — Twyler L Haskins
*Assistant Examiner* — Dwight Alex C Tejano
(74) *Attorney, Agent, or Firm* — The Farrell Law Firm, P.C.

(57) ABSTRACT

An electronic device includes an image sensor including a first pixel subset with a first sensitivity and a second pixel subset having with a second sensitivity, and a processor to process image data generated through the image sensor. The processor obtains image data through each of the first pixel subset and the second pixel subset, select at least one sub-image data based at least on the attribute information of the first sub-image data and the second sub-image data of the
(Continued)

image data, and obtain focus information corresponding to the external subject using the selected sub-image data.

12 Claims, 11 Drawing Sheets

(51) Int. Cl.
*H04N 5/369* (2011.01)
*H04N 5/14* (2006.01)
*H04N 5/232* (2006.01)

(56) References Cited

U.S. PATENT DOCUMENTS

| | | | |
|---|---|---|---|
| 9,307,161 B2 | 4/2016 | Lee et al. | |
| 9,344,642 B2 | 5/2016 | Niemi et al. | |
| 10,009,534 B2 | 6/2018 | Kim | |
| 10,091,434 B2 | 10/2018 | Lee et al. | |
| 2009/0154821 A1 | 6/2009 | Sorek et al. | |
| 2011/0169980 A1* | 7/2011 | Cho | H04N 5/35554 348/223.1 |
| 2012/0002958 A1* | 1/2012 | Muukki | G03B 17/12 396/325 |
| 2012/0274830 A1 | 11/2012 | Kameyama et al. | |
| 2012/0281111 A1* | 11/2012 | Jo | H04N 9/045 348/229.1 |
| 2013/0120644 A1* | 5/2013 | Fujii | H04N 5/23212 348/349 |
| 2014/0063330 A1* | 3/2014 | Matsuyama | H04N 5/2356 348/352 |
| 2014/0184852 A1 | 7/2014 | Niemi et al. | |
| 2015/0009352 A1* | 1/2015 | Shibagami | H04N 5/23212 348/218.1 |
| 2015/0201118 A1 | 7/2015 | Lee et al. | |
| 2015/0256736 A1* | 9/2015 | Fukuhara | H04N 5/23212 348/349 |
| 2016/0241776 A1 | 8/2016 | Kim | |
| 2016/0255262 A1 | 9/2016 | Lee et al. | |
| 2018/0131869 A1* | 5/2018 | Kim | H04N 5/232133 |
| 2018/0213172 A1* | 7/2018 | Ohtsubo | H04N 5/232123 |

FOREIGN PATENT DOCUMENTS

| | | |
|---|---|---|
| KR | 101039404 | 6/2011 |
| KR | 101464765 | 11/2014 |
| KR | 101573131 | 11/2015 |
| KR | 1020160095173 | 8/2016 |
| KR | 1020160100018 | 8/2016 |

* cited by examiner

IMAGE PROCESSING METHOD AND ELECTRONIC DEVICE SUPPORTING SAME

PRIORITY

This application is a National Phase Entry of PCT International Application No. PCT/KR2017/015223 which was filed on Dec. 21, 2017, and claims priority to Korean Patent Application No. 10-2016-0178381, which was filed on Dec. 23, 2016, the content of each of which is incorporated herein by reference.

TECHNICAL FIELD

Various embodiments of the present document relate to a method for processing an image and an electronic device for supporting the same.

BACKGROUND ART

Various types of photographing devices (or imaging devices), such as DSLRs and mirrorless digital cameras, have been introduced. In addition, an electronic device, such as a smartphone, a tablet PC, or the like, provides a function of capturing a picture or a moving picture through a camera module. The electronic device automatically adjusts the focal point (Auto Focus; AF) or automatically adjusts the exposure (Auto Exposure; AE) to support a user without separate settings made by the user, such that the user takes a picture or a moving picture having a proper image quality.

DISCLOSURE

Technical Problem

According to the conventional technology, when the electronic device performs the AF, focus information is obtained from an image having a proper exposure degree. In this case, the electronic device fails to perform the AF due to saturation pixels included in collected image data, under the higher illumination photographing environment having a surrounding light source. In addition, the electronic device fails to perform the AF because the electronic device fails to obtain data used for obtaining the focus information under the lower illumination environment having insufficient surrounding light.

In addition, when the illumination of a subject is lower than the illumination of a surrounding as in a backlight image, the AF may not perform with respect to a subject, which is desired by the user, in an area around the subject. When the electronic device changes an exposure degree to be at a level allowing the AF so as to perform the AF, a live view image through the display may be viewed as being excessively dark or bright, so a user may feel discomfort. In this case, the image may be glittered.

Technical Solution

According to various embodiments of the disclosure, an electronic device may include an image sensor including a first pixel subset having at least one pixel with a first sensitivity and a second pixel subset having at least one pixel with a second sensitivity, and a processor to process image data generated through the image sensor. The processor may be obtain image data of an external subject through each of the first pixel subset and the second pixel subset, identify attribute information of first sub-image data, which corresponds to the first pixel subset, and attribute information of second sub-image data, which corresponds to the second pixel subset, of the image data, select at least one sub-image data of the first sub-image data and the second sub-image data, based at least on the attribute information of the first sub-image data and the attribute information of the second sub-image data, and obtain focus information corresponding to the external subject using the at least one sub-image data.

Advantageous Effects

According to various embodiments of the disclosure, in the method for processing the image and high-illuminance or low-illuminance environment for supporting the same, the AF process may be performed using the plurality of sub-images.

According to various embodiments of the disclosure, in the image processing method and the electronic device supporting the same, the AF is performed through various schemes based on the plurality of sub-images. Accordingly, the AF may be performed with respect the subject desired by the user.

MODE FOR INVENTION

Figure 1:
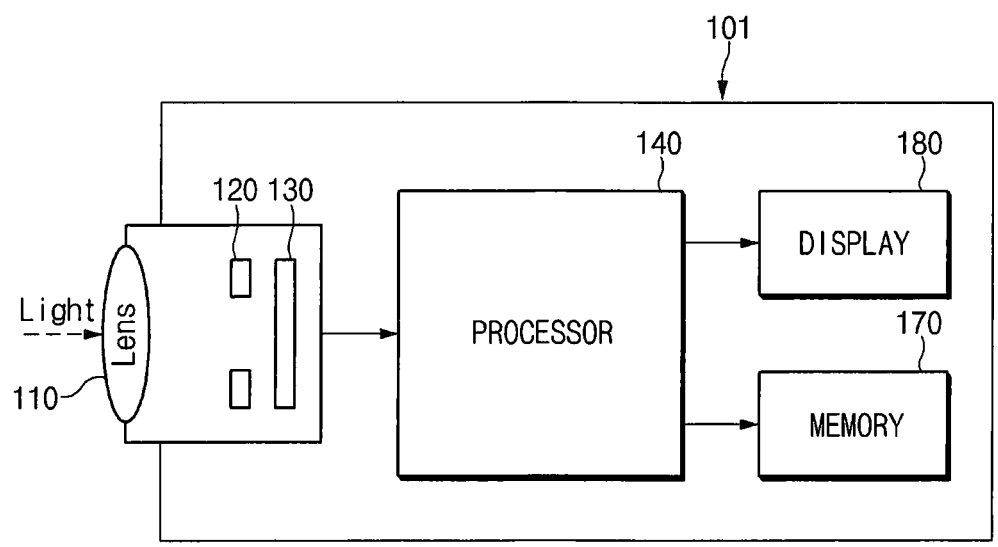
FIG. 1 is a block diagram illustrating an electronic device, according to various embodiments.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a block diagram illustrating an electronic device, according to various embodiments.

Referring to FIG. 1, an electronic device 101 may be a device to capture a still image or a moving picture by collecting external light. The electronic device 101 may include a lens unit 110, a shutter unit 120, an image sensor 130, a processor 140, a memory 170, and a display 180.

According to various embodiments of the disclosure, the lens unit 110 may collect light arriving at the device from a subject. The collected light may be imaged on the image sensor 130. In various embodiments, the lens unit 110 may further include an aperture to adjust an amount of light before the light arrives at the image sensor 130 to be imaged.

According to various embodiments of the disclosure, the shutter unit 120 may adjust an exposure degree of the image sensor 130 by performing slit running. For example, the shutter unit 120 may include a shutter having a mechanical shape or an electronic shutter operating through the control of a sensor. As another example, the shutter unit 120 may be a shutter that electronically includes only a front curtain (front shutter curtain).

According to various embodiments of the disclosure, the image sensor 130 (or an imaging element, or an imaging element unit) may convert light into electronic image data with a photoelectric conversion effect. The image data may be transmitted to the processor 140 through a sensor interface 135. The image sensor 130 may include a group of pixels arranged in two dimensions, and may convert light into electronic image data in each pixel.

According to various embodiments, the image sensor 130 may adjust an amount (exposure degree) of light transmitted to the image sensor 130 by adjusting the shutter unit 120 for exposure time to light, which is set by the processor 140.

According to various embodiments, the image sensor 130 may read out electronic image data resulting from the photoelectric conversion effect recorded in each pixel.

According to various embodiments, the image sensor 130 may include a plurality of pixel subsets. For example, the image sensor 130 may include a first pixel subset having a first sensitivity and a second pixel subset having a second sensitivity. The first pixel subset and the second pixel subset may record mutually different data values when the same light is incident. The image data collected in each pixel subset may be separated and utilized to obtain focus information, respectively. The image data may be selectively used under various conditions or used depending on priorities. The obtaining of the focus information and additional information for the focus information will be described with reference to FIGS. 2 to 11.

The processor 140 may output the image data, which is collected by the image sensor 130, to the display 180 or may store the image data in the memory 170 through various image processing procedures. In various embodiments, the processor 140 may include a preprocessor (e.g., Pre ISP), a main processor (e.g., an ISP, a peripheral controller), or a post processor (e.g., Post-ISP). The preprocessor (e.g., Pre ISP) may perform image matching or gamma processing. For example, when a shaken part is present in a plurality of consecutively captured images, the preprocessor may remove or reduce the shaken part through the image matching process. The main processor may correct or synthesize the signal received from the preprocessor to generate the entire image signal. The main processor may perform a function of controlling overall operations such as amplification, transform, and processing of the signal. The postprocessor may store an image signal, which is provided by the main processor, in the storage unit 170 or may output the image signal to the display 180. The postprocessor may transform an image signal in the form supported by the storage unit 170 or the display 180.

According to various embodiments, the processor 140 may analyze the image data, which is collected by the image sensor 130, to generate a signal that controls the lens unit 110 or the image sensor 130. The processor 140 may adjust, through the signal, such that a subject interested by a user (or a subject) is clearly captured.

The processor 140 may generate data (hereinafter, focus information) for automatically adjusting focus. The processor 140 may generate a control signal to control the lens unit 110 or the image sensor 130 using the generated focus information. The processor 140 may transmit the generated control signal to the lens unit 110 or the image sensor 130. The lens unit 110 or the image sensor 130 may operate in response to the received control signal, and focus may be adjusted.

According to various embodiments, the processor 140 may obtain the focus information using image data mutually different brightness degrees and may control the lens unit 110 using the obtained focus information. The information on the configuration and the function of the processor 140 may be provided as in FIG. 2.

The storage unit 170 may store the image processed through the processor 140. The display 180 may output image data processed by the processor 140 such that the user may identify the image data.

Figure 2:
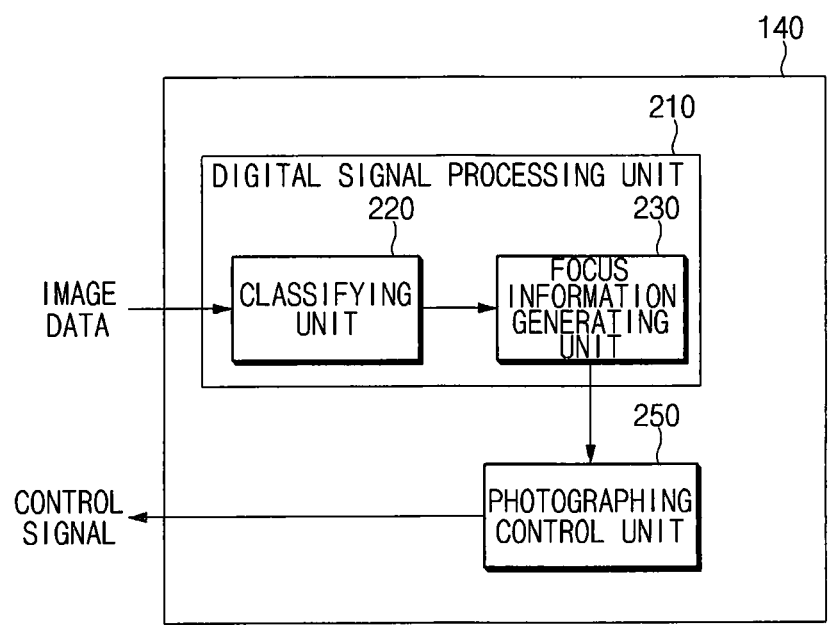
FIG. 2 illustrates the configuration of a processor, according to various embodiments.

FIG. 2 illustrates the configuration of the processor, according to various embodiments. The components illustrated in FIG. 2 are classified based on functions, and the disclosure is not limited thereto.

Referring to FIG. 2, the processor 140 may include a digital signal processing unit 210 and a photographing control unit 250. The digital signal processing unit 210 may include a classifying unit 220 and a focus information generating unit 230.

The digital signal processing unit 210 may process image data collected through the read-out from the image sensor 130 to generate the focus information. The digital signal processing unit 210 may transmit the focus information to the photographing control unit 250.

According to various embodiments, the digital signal processing unit 210 may receive, from the photographing control unit 250, information on a region of interest, which is to be subject to the AF, of a user and may generate focus information for the region of interest.

The classifying unit 220 may classify image data collected from the image sensor 130 depending on brightness degrees. For example, the classifying unit 220 may classify the image data, which is collected from the image sensor 130, into first sub-image data and second sub-image data. The first sub-image data may be data collected from the first pixel subset which is set to have the first sensitivity of the image sensor 130 and the second sub-image data may be data collected from the second pixel subset which is set to have the second sensitivity. The classifying unit 220 may generate a first sub-image based on the first sub-image data and a second sub-image based on the second sub-image data.

The focus information generating unit 230 may generate focus information based on a plurality of sub-images. The focus information generation unit 230 may select at least some of the plurality of sub-images and may obtain the focus information based on the selected sub-images. The focus information generation unit 230 may select the at least some of the plurality of sub-images by reflecting an attribute (e.g., brightness, contrast, or the like) of image data collected from the image sensor 130, attributes of the plurality of sub-images, or an attribute of a region of interest (ROI).

The photographing control unit 250 may perform the AF by using focus information obtained through various exposing processes. The photographing control unit 250 may generate a control signal to control the lens unit 110 or the image sensor 130 to transmit the control signal to the lens unit 110 or the image sensor 130.

Figure 3:
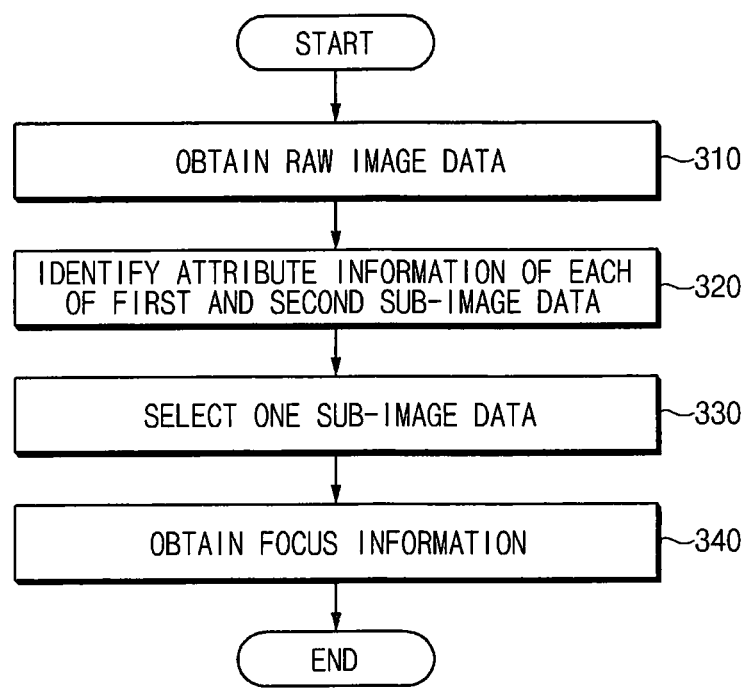
FIG. 3 is a flowchart illustrating a method for processing an image, according to various embodiments.

FIG. 3 is a flowchart illustrating a method for processing an image, according to various embodiments.

Referring to FIG. 3, in operation 310, the processor 140 may obtain image data (hereinafter, raw image data) of an external subject through the image sensor 130. In one embodiment, the raw image data includes first sub-image data (collected through the first pixel subset constituting the image sensor 130) having a first exposing characteristic and second sub-image data (collected through a second pixel subset constituting the image sensor 130) having a second exposing characteristic.

According to various embodiments, the image sensor 130 may include a first pixel sub-pixel (set with the first sensitivity) having the first sensitivity and a second pixel subset (set with the second sensitivity) having the second sensitivity. For example, the first pixel subset may obtain first sub-image data through a plurality of pixels having a first sensitivity characteristic. The second pixel subset may obtain second sub-image data through a plurality of pixels having a second sensitivity characteristic. For example, the first pixel subset may obtain the first sub-image data through a plurality of pixels set with the first sensitivity. The second pixel subset may obtain second sub-image data through a plurality of pixels set with the second sensitivity. The first sub-image data and the second sub-image data may be data collected at the same time In an embodiment, the processor 140 may maintain, as a fixed value, the difference in brightness between the first sub-image data and the second sub-image data when it is possible to set the sensitivities of the first pixel subset and the second pixel subset. For example, the processor 140 controls the pixel subsets such that the first sub-image data has exposure information of 10 EV (exposure value) and the second sub-image data has the value in the range of 7 EV to which the offset value of −3 EV is applied. For example, the first pixel subset and the second pixel subset may share one aperture and one shutter. The processor 140 may determine the aperture and a shutter speed, etc. based on the exposure standard and the measured exposure set by the user. The processor 140 may set the first pixel subset to 10 EV and the second pixel subset to 7 EV to which the specified offset of −3 EV is applied, when the external brightness is 10 LV (light value).

In another embodiment, the processor 140 may variably change the difference in brightness between the first sub-image data and the second sub-image data, depending on the surrounding environment of the electronic device 101. For example, in the case of the higher illumination environment in which a light source is present around the electronic device, the processor 140 may control the sensitivity of each pixel subset such that the first sub-image data has the exposure information of 15 EV, and the second sub-image data have the exposure information of 10 EV to which the offset of −5 EV is applied. As another example, when the electronic device is under the lower illumination environment, the processor 140 may control the sensitivity of each pixel subset such that the first sub-image data has the exposure information of 5 EV and the second sub-image data has the exposure information of 10 EV to which the offset of +5 EV is applied.

According to various embodiments, the processor 140 may determine the brightness of each of the first sub-image data and the second sub-image data and the difference in brightness between the first sub-image data and the second sub-image data, based on a portion of raw image data (hereinafter, region of interest (ROI)). The ROI may be set (as the central region of a screen) through automatic setting, or may be set (as the region around a point touched by the user) through the selection of the user. For example, the processor 140 may determine the difference in brightness between the first sub-image data and the second sub-image data by using only image data in the ROI.

According to various embodiments, the processor 140 sets first exposure time for the first pixel subset to obtain the first sub-image data, and sets second exposure time for the second pixel subset to obtain the second sub-image data. When the first pixel subset and the second pixel subset have the same sensitivity, the brightness of the first sub-image data and the second sub-image data may be varied depending on the exposure time.

In operation 320, the processor 140 may identify, from the raw image data, attribute information of the first sub-image data and attribute information of the second sub-image data. The attribute information may be exposure information of each sub-image data.

In operation 330, the processor 140 may select at least one of the first sub-image data and the second sub-image data to obtain focus information, based at least on the attribute information of the first sub-image data and the attribute information of the second sub-image data. The first sub-image data and the second sub-image data may be different from each other in brightness at corresponding points and the focus information obtained from each sub-image data may be different. For example, when a photograph includes faces A, B, and C, the processor 140 fails to determine the focus area through the first sub-image data. On the other hand, the processor 140 may determine the face of person A as the focus area through the second sub-image data.

According to various embodiments, the processor 140 may select one of the first sub-image data or the second sub-image data attribute information determine whether the first sub-image data or the second sub-image data is based at least on the attribute information of the raw image data, the attribute information of the first sub-image data, and the attribute information of the second sub-image data. The attribute information may include average brightness, an exposure time, a contrast, or a recognition state of a subject.

In one embodiment, the processor 140 may select sub-image data of the first sub-image data and the second sub-image data, based on brightness information around the electronic device. In another embodiment, the processor 140 may select the first sub-image data by default and select the second sub-image data when focus information fails to be obtained from the first sub-image data.

In operation 340, the processor 140 may obtain focus information corresponding to an external subject by using the selected sub-image data.

The processor 140 may control the lens unit 110 by generating a control signal to control the lens unit 110. For example, the processor 140 may determine the position of the focus lens based on the obtained focus information.

According to various embodiments, a method for processing an image is executed in an electronic device including an image sensor including a first pixel subset and a second pixel subset and a processor. The method may include obtaining, by using the processor, image data of a subject outside the electronic device through the image sensor, identifying attribute information of first sub-image data, which corresponds to the first pixel subset, and of second sub-image data, which corresponds to the second pixel subset, of the image data, selecting at least one, sub-image data of the first sub-image data and the second sub-image data, based at least on the attribute information of the first sub-image data and the attribute information of the second sub-image data, and determining focus information corresponding to the external subject using the at least one sub-image data.

According to various embodiments, the method may further include setting sensitivity of the first pixel sub-set included in the image sensor to first sensitivity or with first exposure time, and setting sensitivity of the second pixel sub-set included in the image sensor to second sensitivity or with second exposure time.

According to various embodiments, the identifying of the attribute information may include identifying exposure information of the first sub-image data and the second sub-image data, and determining whether the exposure information satisfies a specified exposure condition.

According to various embodiments, the method for processing the image may further include determining the focus information as focus information of another image sensor, which corresponds to the external subject, included in the electronic device.

Figure 4:
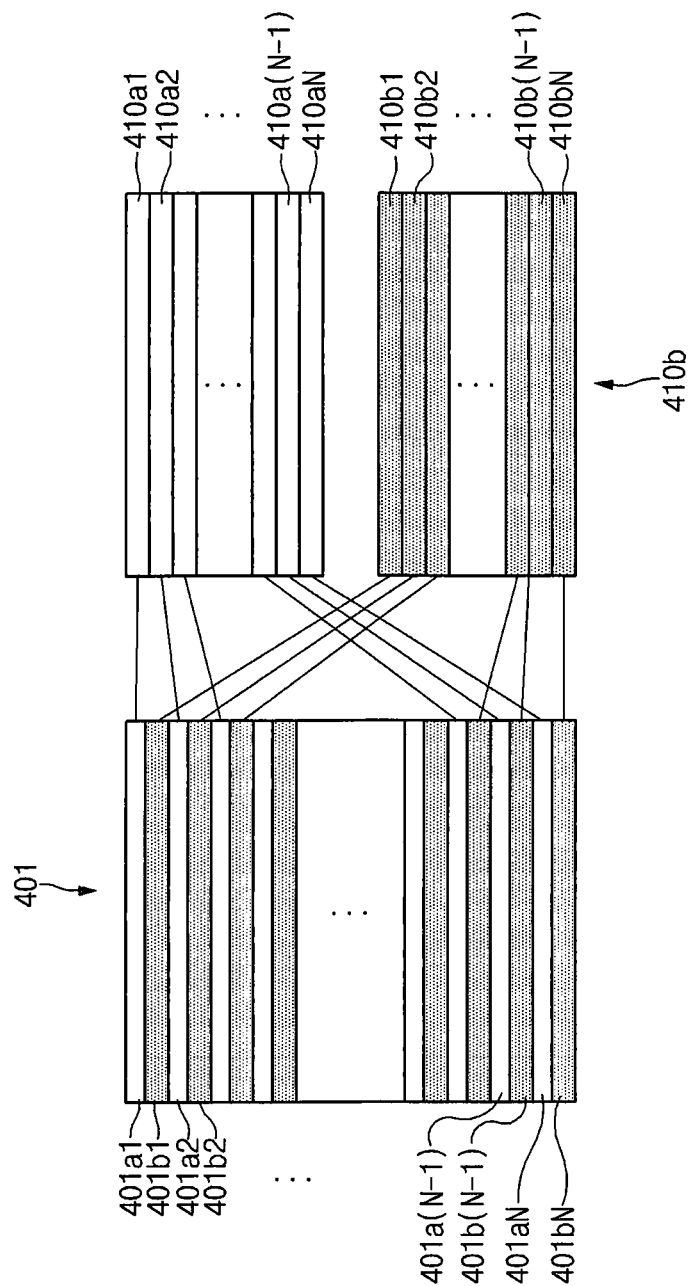
FIG. 4 is a view illustrating that image data is obtained from an image sensor, according to various embodiments.

FIG. 4 is a view illustrating that image data is obtained from the image sensor, according to various embodiments. FIG. 4 illustrates one example, and the disclosure is not limited thereto.

Referring to FIG. 4, the processor 140 may obtain raw image data for an external subject through the image sensor 401. In one embodiment, the processor 140 may control first pixel subsets 401a1, 401a2, . . . , and 401aN, and second pixel subsets 401b1, 401b2, . . . , and 401bN, such that the image sensor 401 has mutually different sensitivity characteristics depending on lines. In another embodiment, the image sensor 401 may be implemented such that first pixel subsets 401a1, 401a2 . . . and 401aN having the first sensitivity and second pixel subsets 401b1, 401b2 . . . and 401bN having the second sensitivity are provided alternately in the form of a line. Although FIG. 4 illustrates that the first pixel subsets 401a1, 401a2 . . . and 401aN and the second pixel subsets 401b1, 401b2, . . . , and 401bN are provided alternately in the form of a line, the disclosure is not limited thereto. In other words, various forms may be implemented. The additional information on the implementation form of the image sensor may be provided with reference to FIG. 6.

In one embodiment, the processor 140 may obtain the first sub-image data 410a1, . . . , and 410aN through the first pixel subset 401a1, 401a2, . . . , and 401aN of the image sensor 401, and may obtain the second sub-image data 410b1, 410bN through the second pixel subsets 401b1, 401b2 . . . and 401bN.

The first sub-image data 410a1, 410a2 . . . and 410aN may be data collected by pixel subsets more sensitive to light than those of the second sub-image data 410b1, 410b2, and 410bN.

The first pixel subsets 401a1, 401a2 . . . and 401aN and the second pixel subsets 401b1, 401b2 . . . and 401bN may be set such that the first sub-image data 410a1, 410a2 . . . and 410aN and the second sub-image data 410b1, 410b2, . . . , and 410bN have a specified brightness difference (e.g., 3 EV), or have variable brightness differences depending on the surrounding environments. For example, the first sub-image data 410a1 obtained through the first pixel subset 401a1 and the second sub-image data 410b1 obtained through the second pixel subset 401b1 may have the brightness difference of 3 EV. The first sub-image data 410a2 obtained through the first pixel subset 401a2 and the second sub-image data 410b2 obtained through the second pixel subset 401b2 may have a brightness difference of 3 EV.

The processor 140 may obtain the focus information using at least one selected from the first sub-image data 410a1, . . . , and 410aN or the second sub-image data 410b1, 410b2, . . . , and 410bN based on the specified criterion. For example, the processor 140 may select sub-image data allowing the obtainment of focus information. As another example, the processor 140 may select the first sub-image data 410a1, . . . , and 410aN by default, and may select the second sub-image data 410b1, 410b2, . . . , and 410bN when it is difficult to obtain the focus information from the first sub-image 401a.

As another example, the processor 140 may obtain focus information by using the second sub-image data 410b1, 410b2, . . . , and 410bN, which is darker, under higher illumination environment, and may obtain focus information by using the first sub-image data 410a1, . . . , and 410aN, which is brighter, under the lower illumination environment.

As another example, the processor 140 may obtain focus information by using the second sub-image data 410b1, 410b2, . . . , and 410bN, which is darker, when the average brightness of the first sub-image data 410a1, 410a2, . . . , and 410aN and the second sub-image data 410b1, 410b2 . . . and 410bN exceeds a reference value. In addition, when the average brightness of the first sub-image data 410a1, 410a2, . . . , and 410aN and the second sub-image data 410b1, 410b2, . . . , and 410bN is equal to or less than the reference value, the processor 140 may obtain the focus information by using the first sub-image data 410a1, . . . , and 410aN which is brighter.

Figure 5:
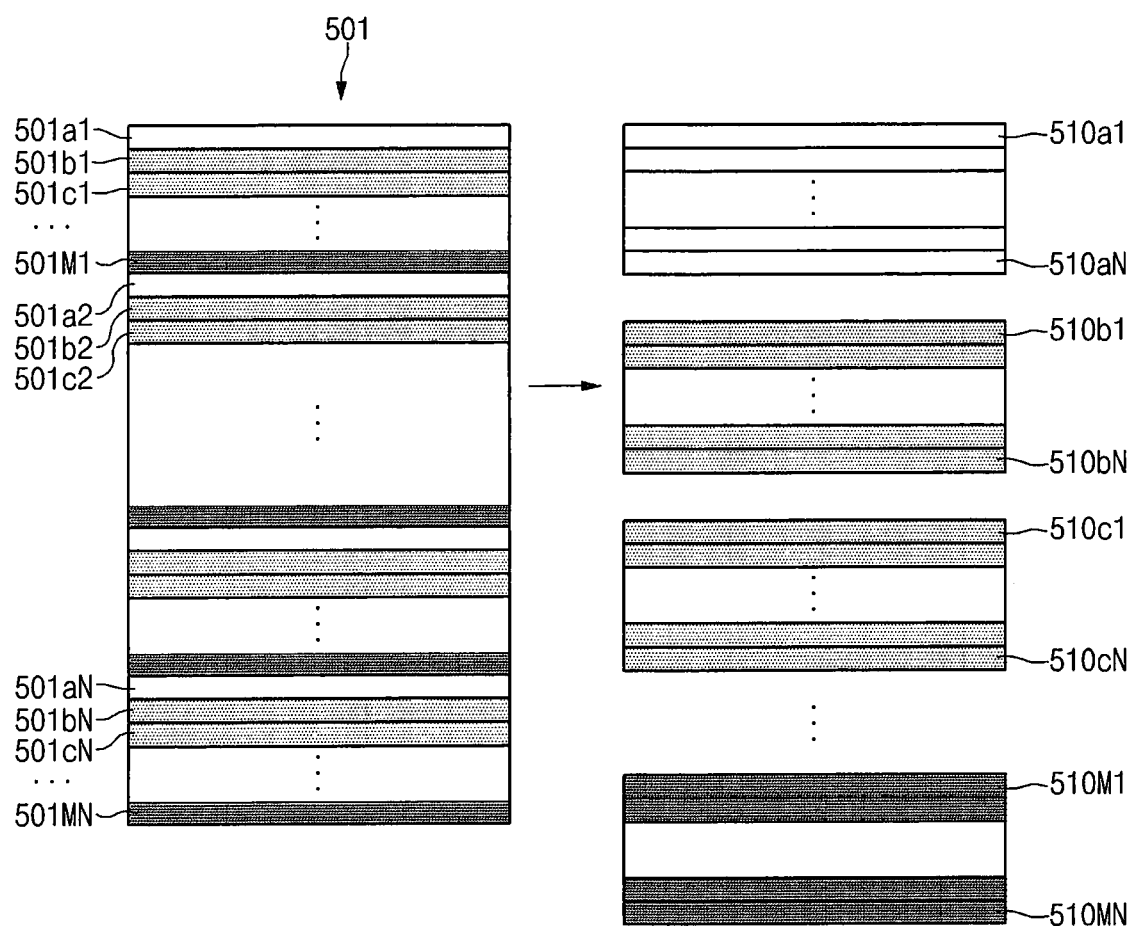
FIG. 5 is a view illustrating that an image sensor having an extension form obtains image data, according to various embodiments.

FIG. 5 is a view illustrating that a plurality of sub-image data are obtained from an image sensor, according to various embodiments. FIG. 5 illustrates one example, and the disclosure is not limited thereto.

Referring to FIG. 5, the processor 140 may collect raw image data for an external subject through an image sensor 501. The image sensor 501 may have the form that a first pixel subset, a second pixel subset, . . . , and an $M^{th}$ pixel subset are sequentially combined, which is different from the image sensor 401 of FIG. 4. The first to $M^{th}$ pixel subsets may have forms of being sequentially brightened or darkened with the difference in specified sensitivity.

In various embodiments, the processor 140 may control first pixel subsets 501a1, 501a2, . . . , and 501aN to $M^{th}$ pixel subsets 501M1, 501M2, . . . , and 501MN such that the image sensor 501 has different sensitivity characteristics depending on lines.

The processor 140 may obtain the first sub-image data 510a1, 510a2, . . . and 510aN through first pixel subsets 501a1, 501a2, . . . , and 501aN, and may obtain second sub-image data 510b1, 510b2, . . . and 510bN through second pixel subsets 501b1, 501b2, and 501bN. Similarly, the processor 140 may obtain Mth sub-image data 510M1, . . . , and 510MN through $M^{th}$ pixel subsets 501M1, . . . , and 501MN of the image sensor 501.

When the M value increases, sub-image data having various brightness degrees may be generated, and various types of focus information may be obtained. The AF may be performed through the specified algorithm using the obtained focus information.

Figure 6:
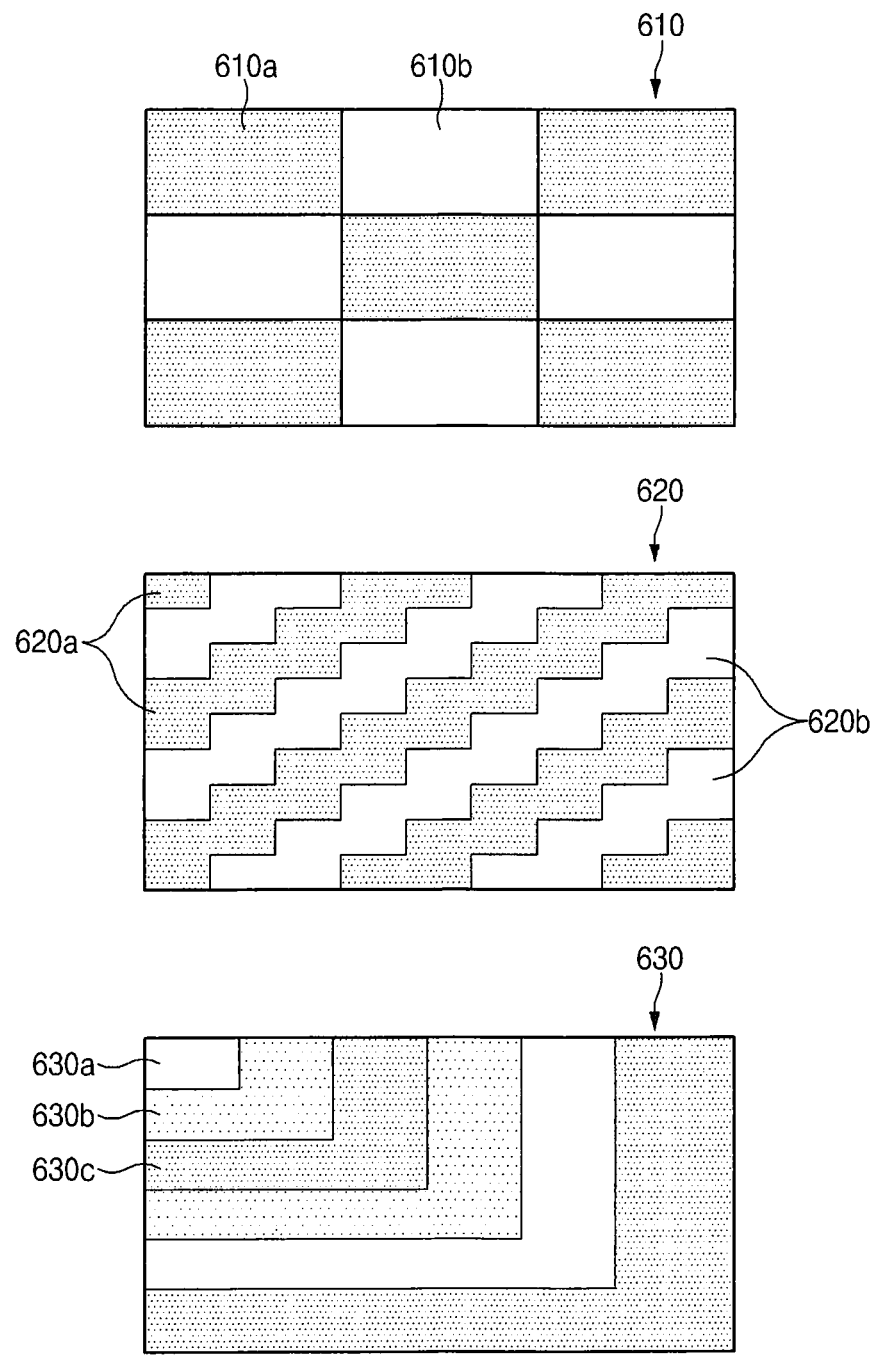
FIG. 6 is a view illustrating various patterns of an image sensor, according to various embodiments.

FIG. 6 is a view illustrating various patterns of an image sensor, according to various embodiments.

Referring to FIG. 6, an image sensor 610 may include a first pixel subset 610a and a second pixel subset 610b. Second pixel subsets 610b may be arranged in up/down/left/right directions of the first pixel subset 610a, and different first pixel subsets 610a may be arranged in the diagonal area. Each of the first pixel subset 610a and the second pixel subset 610b may be one pixel or may be pixel subsets including a plurality of pixels.

In an image sensor 620, first pixel subsets 620a and second pixel subsets 620b may be arranged to cross each other in the diagonal direction.

In an image sensor 630, a first pixel subset 630a to a third pixel subset 630c may be arranged to be in the form of extending from a left upper portion which is one point.

FIG. 6 illustrates one example, but the disclosure is not limited thereto. The image sensor 130 may be implemented by applying patterns having various shapes.

Figure 7:
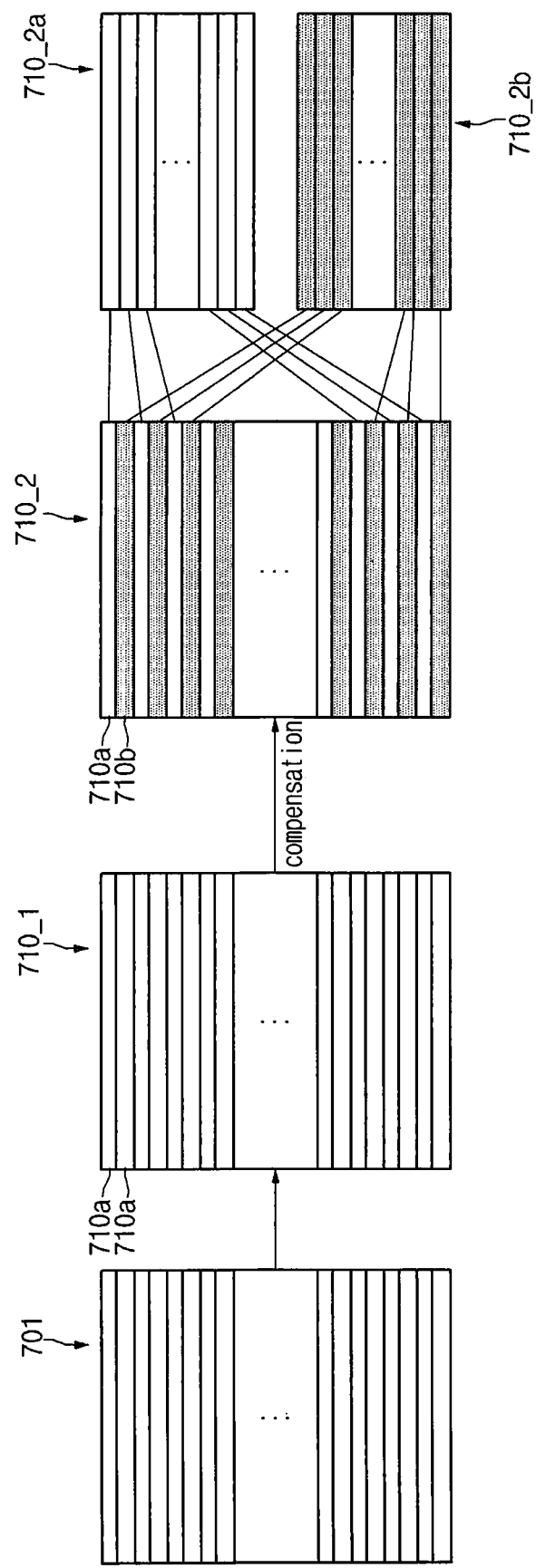
FIG. 7 is a view illustrating that a sub-image is obtained through compensation, according to various embodiments.

FIG. 7 is a view illustrating an image sensor having single sensitivity, according to various embodiments.

Referring to FIG. 7, the processor 140 may collect raw image data 710_1 through an image sensor 701 having single sensitivity. A pixel subset (e.g., each line 710_1 of the image sensor 701) constituting the image sensor 701 may have the characteristics of the same sensitivity or may set to have the same sensitivity.

The processor 140 may change the brightness of a portion of raw image data 710_1 through post correction. For example, the processor 140 may generate image data 710_2, which is corrected, by maintaining the first line, the third line, or the fifth line of the raw image data 710_1 to first sub-image data 710a, and changing the second line, the fourth line, and the sixth line to sub-image data 710b having changed brightness. The processor 140 may generate first sub-image data 710_2a and second sub-image data 720_2b from the corrected image data 710_2.

The manner of generating the image data 710_2 corrected through post correction may produce a greater effect when the image sensor 701 has a great dynamic range (DR) or when compensation is performed in an analogue manner.

Figure 8:
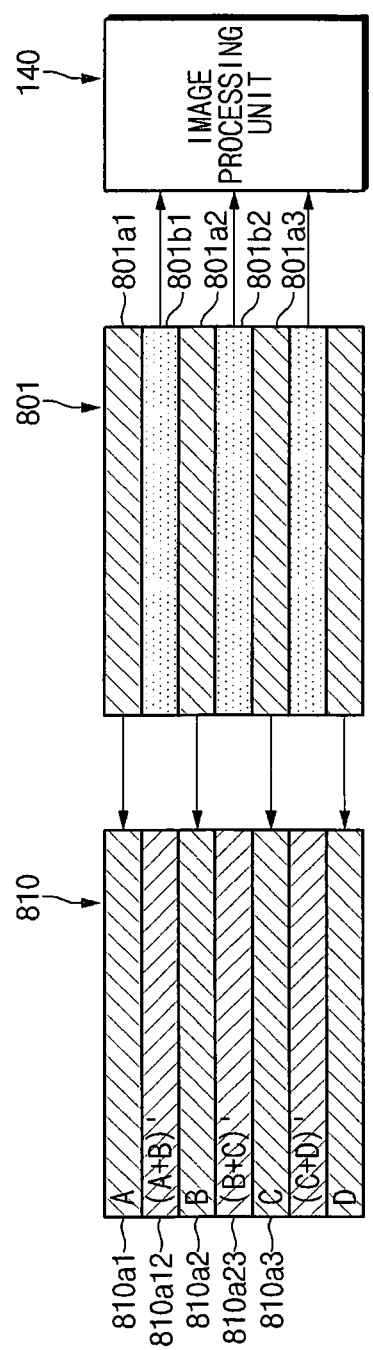
FIG. 8 is a view illustrating that a display output image of a single lens camera is generated, according to various embodiments.

According to various embodiments, when sub-image data, which is long exposed, having exposure time longer than reference exposure time (e.g., exposure time set through the AE) and sub-image data, which is shortly exposed, having exposure time shorter than the reference exposure time. The sub-image data, which is shortly exposed, may be used for shake correction (e.g., hand-shake correction or subject movement correction) of the sub-image data which is long exposed FIG. 8 is a view illustrating that a display output image of the single lens camera is generated. FIG. 8 illustrates an example, and the disclosure is not limited thereto.

Referring to FIG. 8, the processor 140 may collect raw image data for an external subject through an image sensor 801. The image sensor 801 may have the form that first pixel subsets 801a1, 801a2, . . . , and 801aN and second pixel subsets 801b1, 801b2, . . . , and 801bN are provided alternately in the unit of a line.

The processor 140 may generate an output image 810 (e.g., a live view image), which is to be output to a display 180, by using sub-image data collected from one of first pixel subsets 801a1, 801a2, . . . , and 801aN or second pixel subsets 801b1, 801b2, . . . , and 801bN. Although FIG. 8 illustrates the case of forming the output image 810 by using first sub-image data collected from the first pixel subsets 801a1, 801a2, . . . , and 801aN, the disclosure is applicable even to the case of using second sub-image data collected from second pixel subsets 801b1, 801b2, . . . , and 801bN.

The processor 140 may maintain first sub-image data 810a1, 810a2, 810aN of raw image data, which is collected by the image sensor 801, and may substitute data areas corresponding to second sub-image data using the first sub-image data 810a1, 810a2, . . . , and 810aN. For example, a first line, a third line, and a fifth line are may be maintained with first sub-image data 810a1, 810a2, 810aN, and a second line may be substituted with data compensated by combining first sub-image data 810a1 and second sub-image data 810a1 with each other. Similarly, the fourth line may be substituted with data compensated by combining the first sub-image data 810a2 with the first sub-image data 810a3.

When the raw image data is directly output through the display 180, a user may feel that the output image is strange. However, when the compensated output image 810 is output, the strange feeling of the user may be reduced.

According to an embodiment, when the resolution of the display 180 is lower than any one of the first sub-image data or the second sub-image data, the processor 140 may generate a live-view image by using at least one (or a portion of at least one) of the first sub-image data or the second sub-image data.

According to another embodiment, when the resolution preset for a still image is lower than any one of the first sub-image data or the second sub-image data, the processor 140 may generate the still image by using at least one (or a portion of at least one) of the first sub-image data or the second sub-image data.

Figure 9:
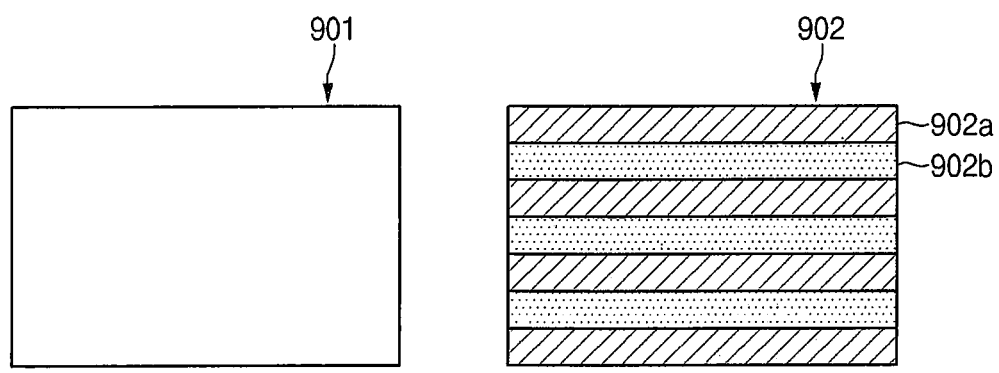
FIG. 9 is a view illustrating that a display output image of a dual-lens camera is generated.

FIG. 9 is a view illustrating that a display output image of a dual-lens camera is generated. FIG. 9 illustrates one example, but the disclosure is not limited thereto.

Referring to FIG. 9, the processor 140 may collect raw image data through the first image sensor 901 and the second image sensor 902 of the dual-lens camera. The raw image data collected by the first image sensor 901 may be a uniform exposure image and the raw image data collected at the second image sensor 902 may be data having different exposure degrees for each line to obtain focus information The processor 140 may output the image through the display 180 based on the raw image data collected through the first image sensor 901, and the raw image data collected through the second image sensor 902 may be used to obtain the focus information.

According to various embodiments, the processor 140 may determine the focus information of the camera module on which the first image sensor 901 is mounted, based on the focus information obtained through the second image sensor 902.

An electronic device 1001 in a network environment 1000 according to various embodiments of the present disclosure will be described with reference to FIG. 10. The electronic device 1001 may include a bus 1010, a processor 1020, a memory 1030, an input/output interface 1050, a display 1060, and a communication interface 1070. In various embodiments of the present disclosure, at least one of the foregoing elements may be omitted or another element may be added to the electronic device 1001. The bus 1010 may include a circuit for connecting the above-mentioned elements 1010 to 1070 to each other and transferring communications (e.g., control messages and/or data) among the above-mentioned elements. The processor 1020 may include at least one of a central processing unit (CPU), an application processor (AP), or a communication processor (CP). The processor 1020 may perform data processing or an operation related to communication and/or control of at least one of the other elements of the electronic device 1001.

The memory 1030 may include a volatile memory and/or a nonvolatile memory. The memory 1030 may store instructions or data related to at least one of the other elements of the electronic device 1001. According to an embodiment of the present disclosure, the memory 1030 may store software and/or a program 1040. The program 1040 may include, for example, a kernel 1041, a middleware 1043, an application programming interface (API) 1045, and/or an application program (or an application) 1047. At least a portion of the kernel 1041, the middleware 1043, or the API 1045 may be referred to as an operating system (OS). The kernel 1041 may control or manage system resources (e.g., the bus 1010, the processor 1020, the memory 1030, or the like) used to perform operations or functions of other programs (e.g., the middleware 1043, the API 1045, or the application program 1047). Furthermore, the kernel 1041 may provide an interface for allowing the middleware 1043, the API 1045, or the application program 1047 to access individual elements of the electronic device 1001 in order to control or manage the system resources.

The middleware 1043 may serve as an intermediary so that the API 1045 or the application program 1047 communicates and exchanges data with the kernel 1041. Furthermore, the middleware 1043 may handle one or more task requests received from the application program 1047 according to a priority order. For example, the middleware 1043 may assign at least one application program 1047 a priority for using the system resources (e.g., the bus 1010, the processor 1020, the memory 1030, or the like) of the electronic device 1001. For example, the middleware 1043 may handle the one or more task requests according to the priority assigned to the at least one application, thereby performing scheduling or load balancing with respect to the one or more task requests. The API 1045, which is an interface for allowing the application 1047 to control a function provided by the kernel 1041 or the middleware 1043, may include, for example, at least one interface or function (e.g., instructions) for file control, window control, image processing, character control, or the like. The input/output interface 1050 may serve to transfer an instruction or data input from a user or another external device to (an)other element(s) of the electronic device 1001. Furthermore, the input/output interface 1050 may output instructions or data received from (an)other element(s) of the electronic device 1001 to the user or another external device.

The display 1060 may include, for example, a liquid crystal display (LCD), a light-emitting diode (LED) display, an organic light-emitting diode (OLED) display, a microelectromechanical systems (MEMS) display, or an electronic paper display. The display 1060 may present various content (e.g., a text, an image, a video, an icon, a symbol, or the like) to the user. The display 1060 may include a touch screen, and may receive a touch, gesture, proximity or hovering input from an electronic pen or a part of a body of the user. The communication interface 1070 may set communications between the electronic device 1001 and an external device (e.g., a first external electronic device 1002, a second external electronic device 1004, or a server 1006). For example, the communication interface 1070 may be connected to a network 1062 via wireless communications or wired communications so as to communicate with the external device (e.g., the second external electronic device 1004 or the server 1006).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1064. The short-range communications may include at least one of wireless fidelity (Wi-Fi), Bluetooth, near field communication (NFC), magnetic stripe transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1062 may include at least one of telecommunications networks, for example, a computer network (e.g., local area network (LAN) or wide area network (WAN)), the Internet, or a telephone network.

The types of the first external electronic device 1002 and the second external electronic device 1004 may be the same as or different from the type of the electronic device 1001. According to an embodiment of the present disclosure, the server 1006 may include a group of one or more servers. A portion or all of operations performed in the electronic device 1001 may be performed in one or more other electronic devices (e.g., the first electronic device 1002, the second external electronic device 1004, or the server 1006). When the electronic device 1001 should perform a certain function or service automatically or in response to a request, the electronic device 1001 may request at least a portion of functions related to the function or service from another device (e.g., the first electronic device 1002, the second external electronic device 1004, or the server 1006) instead of or in addition to performing the function or service for itself. The other electronic device (e.g., the first electronic device 1002, the second external electronic device 1004, or the server 1006) may perform the requested function or additional function, and may transfer a result of the performance to the electronic device 1001. The electronic device 1001 may use a received result itself or additionally process the received result to provide the requested function or service. To this end, for example, a cloud computing technology, a distributed computing technology, or a client-server computing technology may be used.

Figure 11:
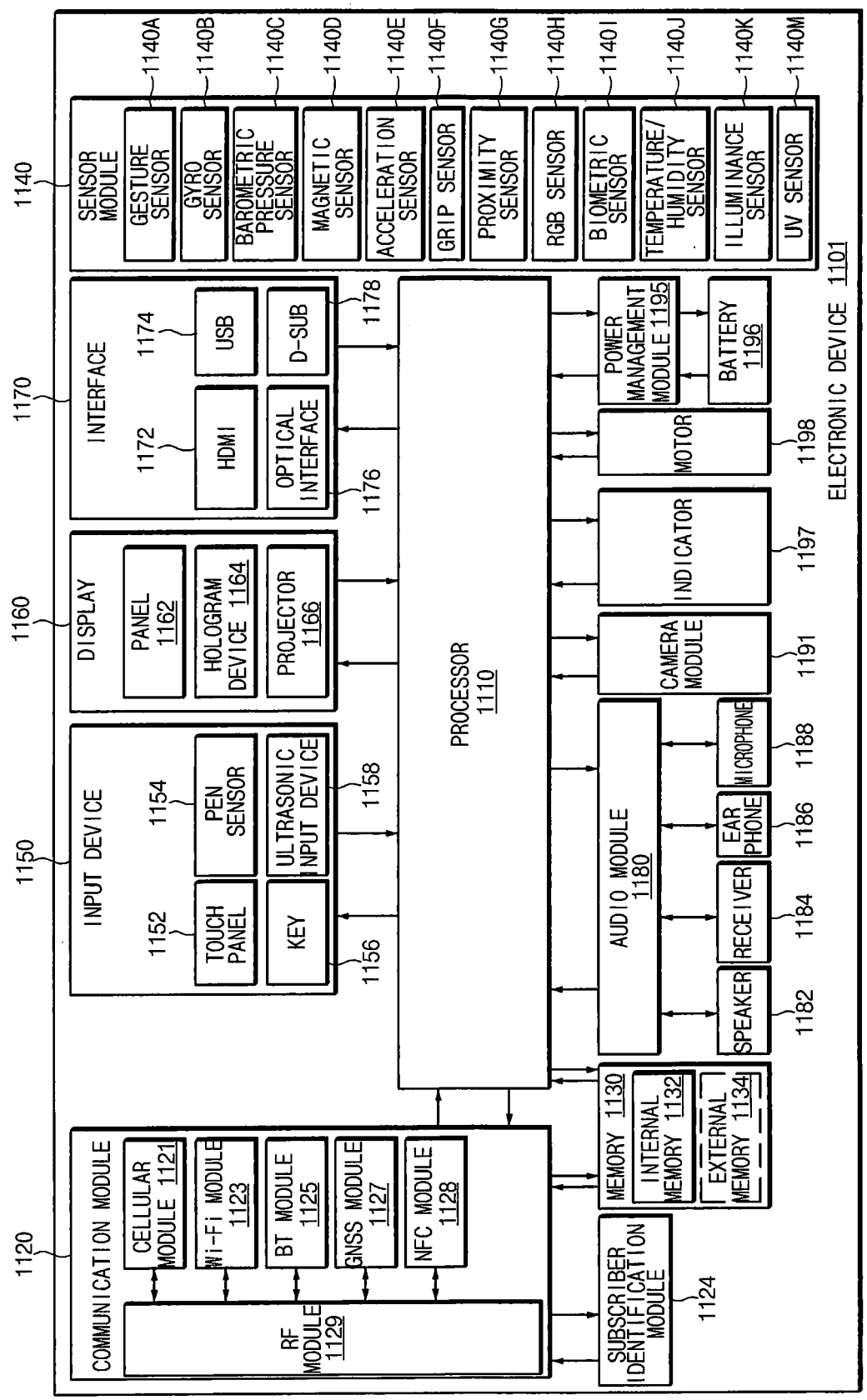
FIG. 11 is a block diagram of the electronic device, according to various embodiments.

FIG. 11 is a block diagram illustrating an electronic device according to an embodiment of the present disclosure.

Figure 10:
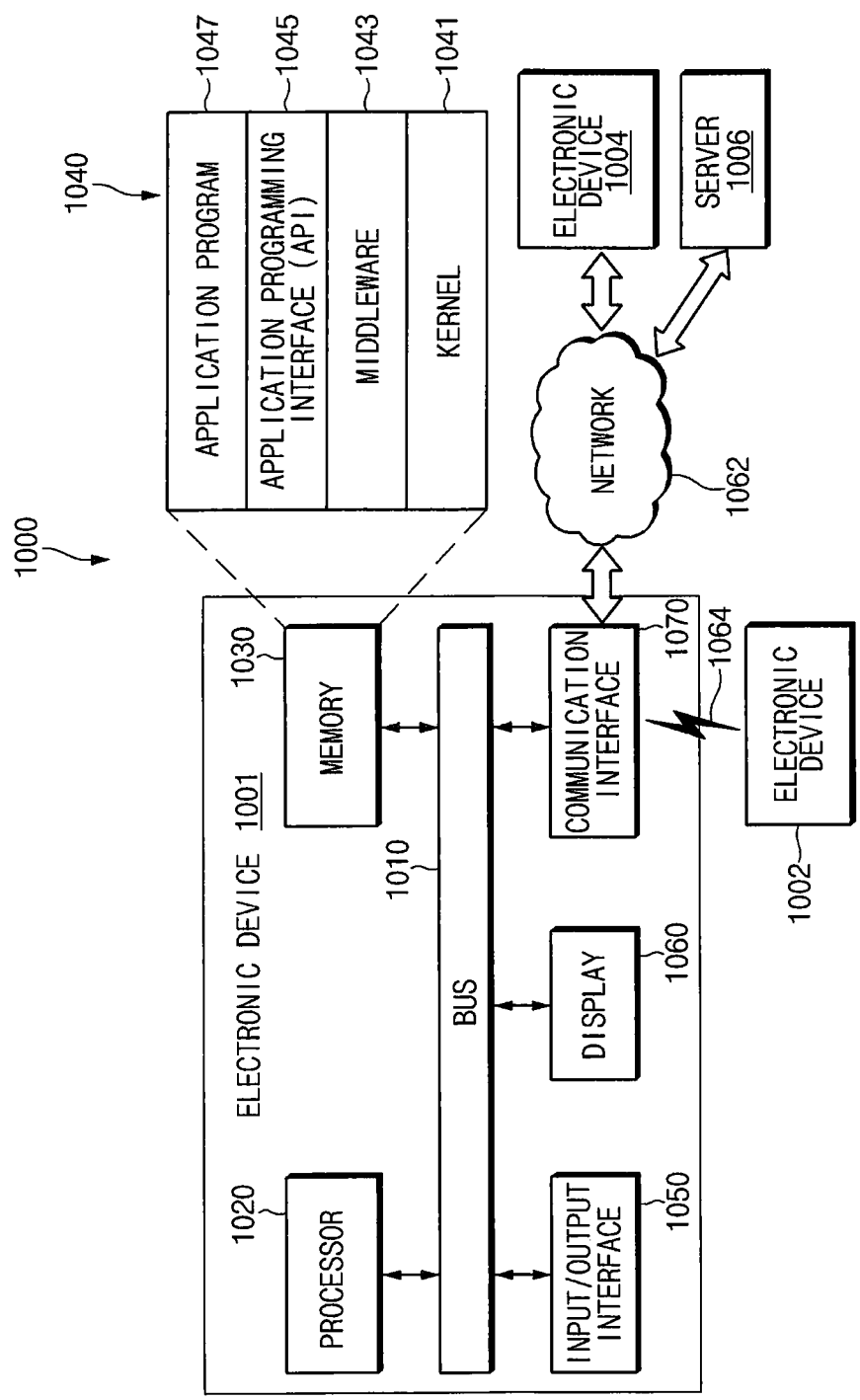
FIG. 10 illustrates an electronic device in a network environment.

An electronic device 1101 may include, for example, a part or the entirety of the electronic device 1001 illustrated in FIG. 10. The electronic device 1101 may include at least one processor (e.g., AP) 1110, a communication module 1120, a subscriber identification module (SIM) 1124, a memory 1130, a sensor module 1140, an input device 1150, a display 1160, an interface 1170, an audio module 1180, a camera module 1191, a power management module 1195, a battery 1196, an indicator 1197, and a motor 1198. The processor 1110 may run an operating system or an application program so as to control a plurality of hardware or software elements connected to the processor 1110, and may process various data and perform operations. The processor 1110 may be implemented with, for example, a system on chip (SoC). According to an embodiment of the present disclosure, the processor 1110 may further include a graphic processing unit (GPU) and/or an image signal processor. The processor 1110 may include at least a portion (e.g., a cellular module 1121) of the elements illustrated in FIG. 11. The processor 1110 may load, on a volatile memory, an instruction or data received from at least one of other elements (e.g., a nonvolatile memory) to process the instruction or data, and may store various data in a nonvolatile memory.

The communication module 1120 may have a configuration that is the same as or similar to that of the communication interface 1070 of FIG. 10. The communication module 1120 may include, for example, a cellular module 1121, a Wi-Fi module 1123, a Bluetooth (BT) module 1125, a GNSS module 1127 (e.g., a GPS module, a GLONASS module, a BeiDou module, or a Galileo module), a NFC module 1128, and a radio frequency (RF) module 1129. The cellular module 1121 may provide, for example, a voice call service, a video call service, a text message service, or an Internet service through a communication network. The cellular module 1121 may identify and authenticate the electronic device 1101 in the communication network using the subscriber identification module 1124 (e.g., a SIM card). The cellular module 1121 may perform at least a part of functions that may be provided by the processor 1110. The cellular module 1121 may include a communication processor (CP). Each of the Wi-Fi module 1123, the Bluetooth module 1125, the GNSS module 1127 and the NFC module 1128 may include, for example, a processor for processing data transmitted/received through the modules. According to some various embodiments of the present disclosure, at least a part (e.g., two or more) of the cellular module 1121, the Wi-Fi module 1123, the Bluetooth module 1125, the GNSS module 1127, and the NFC module 1128 may be included in a single integrated chip (IC) or IC package. The RF module 1129 may transmit/receive, for example, communication signals (e.g., RF signals). The RF module 1129 may include, for example, a transceiver, a power amp module (PAM), a frequency filter, a low noise amplifier (LNA), an antenna, or the like. According to another embodiment of the present disclosure, at least one of the cellular module 1121, the Wi-Fi module 1123, the Bluetooth module 1125, the GNSS module 1127, or the NFC module 1128 may transmit/receive RF signals through a separate RF module. The SIM 1124 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1130 (e.g., the memory 1030) may include, for example, an internal memory 1132 or an external memory 1134. The internal memory 1132 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD). The external memory 1134 may include a flash drive such as a compact flash (CF), a secure digital (SD), a Micro-SD, a Mini-SD, an extreme digital (xD), a MultiMediaCard (MMC), a memory stick, or the like. The external memory 1134 may be operatively and/or physically connected to the electronic device 1101 through various interfaces.

The sensor module 1140 may, for example, measure physical quantity or detect an operation state of the electronic device 1101 so as to convert measured or detected information into an electrical signal. The sensor module 1140 may include, for example, at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., a red/green/blue (RGB) sensor), a biometric sensor 1140I, a temperature/humidity sensor 1140J, an illumination sensor 1140K, or an ultraviolet (UV) sensor 1140M. Additionally or alternatively, the sensor module 1140 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1140 may further include a control circuit for controlling at least one sensor included therein. In some various embodiments of the present disclosure, the electronic device 1101 may further include a processor configured to control the sensor module 1140 as a part of the processor 1110 or separately, so that the sensor module 1140 is controlled while the processor 1110 is in a sleep state.

The input device 1150 may include, for example, a touch panel 1152, a (digital) pen sensor 1154, a key 1156, or an ultrasonic input device 1158. The touch panel 1152 may employ at least one of capacitive, resistive, infrared, and ultraviolet sensing methods. The touch panel 1152 may further include a control circuit. The touch panel 1152 may further include a tactile layer so as to provide a haptic feedback to a user. The (digital) pen sensor 1154 may include, for example, a sheet for recognition which is a part of a touch panel or is separate. The key 1156 may include, for example, a physical button, an optical button, or a keypad. The ultrasonic input device 1158 may sense ultrasonic waves generated by an input tool through a microphone 1188 so as to identify data corresponding to the ultrasonic waves sensed.

The display 1160 (e.g., the display 1060) may include a panel 1162, a hologram device 1164, or a projector 1166. The panel 1162 may have a configuration that is the same as or similar to that of the display 1060 of FIG. 10. The panel 1162 may be, for example, flexible, transparent, or wearable. The panel 1162 and the touch panel 1152 may be integrated into a single module. The hologram device 1164 may display a stereoscopic image in a space using a light interference phenomenon. The projector 1166 may project light onto a screen so as to display an image. The screen may be disposed in the inside or the outside of the electronic device 1101. According to an embodiment of the present disclosure, the display 1160 may further include a control circuit for controlling the panel 1162, the hologram device 1164, or the projector 1166. The interface 1170 may include, for example, an HDMI 1172, a USB 1174, an optical interface 1176, or a D-subminiature (D-sub) 1178. The interface 1170, for example, may be included in the communication interface 1070 illustrated in FIG. 10. Additionally or alternatively, the interface 1170 may include, for example, a mobile high-definition link (MHL) interface, an SD card/multimedia card (MMC) interface, or an infrared data association (IrDA) interface.

The audio module 1180 may convert, for example, a sound into an electrical signal or vice versa. At least a portion of elements of the audio module 1180 may be included in the input/output interface 1050 illustrated in FIG. 10. The audio module 1180 may process sound information input or output through a speaker 1182, a receiver 1184, an earphone 1186, or the microphone 1188. The camera module 1191 is, for example, a device for shooting a still image or a video. According to an embodiment of the present disclosure, the camera module 1191 may include at least one image sensor (e.g., a front sensor or a rear sensor), a lens, an image signal processor (ISP), or a flash (e.g., an LED or a xenon lamp). The power management module 1195 may manage power of the electronic device 1101. According to an embodiment of the present disclosure, the power management module 1195 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1196 and a voltage, current or temperature thereof while the battery is charged. The battery 1196 may include, for example, a rechargeable battery and/or a solar battery.

The indicator 1197 may display a specific state of the electronic device 1101 or a part thereof (e.g., the processor 1110), such as a booting state, a message state, a charging state, or the like. The motor 1198 may convert an electrical signal into a mechanical vibration, and may generate a vibration or haptic effect. Although not illustrated, a processing device (e.g., a GPU) for supporting a mobile TV may be included in the electronic device 1101. The processing device for supporting a mobile TV may process media data according to the standards of digital multimedia broadcasting (DMB), digital video broadcasting (DVB), MediaFLO™, or the like. Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an electronic device includes an image sensor including a first pixel subset having at least one pixel with a first sensitivity and a second pixel subset having at least one pixel with a second sensitivity, and a processor to process image data generated through the image sensor, wherein the processor is configured to obtain image data of an external subject through each of the first pixel subset and the second pixel subset, identify attribute information of first sub-image data, which corresponds to the first pixel subset, and attribute information of second sub-image data, which corresponds to the second pixel subset, of the image data, select at least one sub-image data of the first sub-image data and the second sub-image data, based at least on the attribute information of the first sub-image data and the attribute information of the second sub-image data, and obtain focus information corresponding to the external subject using the at least one sub-image data.

According to various embodiments, the processor is configured to identify exposure information of the first sub-image data and the second sub-image data, through at least a portion of an operation of identifying the attribute information, and determine whether the exposure information satisfies a specified exposure condition.

According to various embodiments, the processor is configured to select at least one sub-image data based on information on surrounding brightness of the electronic device. The processor is configured to compare the first sub-image data with the second sub-image data, and select the at least one sub-image data based on the comparison result.

According to various embodiments, the electronic device further includes another image sensor, wherein the processor is configured to determine the focus information as focus information of the another image sensor corresponding to the external subject.

According to various embodiments, the electronic device further includes a display, wherein the processor is configured to obtain image data corresponding to the external subject through the another image sensor; and display the obtained image data through the display.

According to various embodiments, the processor is configured to display the at least one sub-image data through the display. The processor is configured to generate third sub-image data corresponding to remaining image data of the image data except for the at least one sub-image data, and output, to the display, image data, which is obtained by synthesizing the at least one sub-image data and the third sub-image data, through at least a portion of the displaying operation.

According to various embodiments, the processor is configured to set sensitivity of the first pixel sub-set to a third sensitivity, and set sensitivity of the second pixel sub-set to fourth sensitivity.

According to various embodiments, the first sub-image data and the second sub-image data are simultaneously set through the image sensor.

According to various embodiments, an electronic device includes an image sensor including a plurality of pixels, and a processor, wherein the processor is configured to set a first pixel subset of the plurality of pixels to have first sensitivity or first exposure time, set a second pixel subset of the plurality of pixels to have second sensitivity or second exposure time, obtain image data of an external subject through the first pixel subset and the second pixel subset, identify attribute information of first sub-image data, which corresponds to the first pixel subset, and of second sub-image data, which corresponds to the second pixel subset, of the image data, select at least one sub-image data of the first sub-image data and the second sub-image data, based at least on the attribute information of the first sub-image data and the attribute information of the second sub-image data, and determine focus information corresponding to the external subject using the at least one sub-image data.

According to various embodiments, the processor is configured to identify exposure information of the first sub-image data and the second sub-image data at least in part in the operation of identifying the attribute information, and identify whether the exposure information satisfies the specified exposure condition.

According to various embodiments, the electronic device further includes another image sensor, and the processor is configured to determine the focus information as the focus information of the other image sensor corresponding to the external object.

According to various embodiments, the electronic device further includes a display, wherein the processor is configured to acquire image data corresponding to the external object via the other image sensor, and to display the acquired image data through the display.

According to various embodiments, the processor is configured to display the at least one sub-image data via the display.

According to various embodiments, the processor is configured to generate third sub-image data corresponding to image data, excluding the at least one sub-image data of the image data, and generate, the at least one of sub-image data, and the third sub-image data through the display.

The term "module" used in this disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed. At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1020), may cause the one or more processors to perform a function corresponding to the instruction. The computer-readable storage media, for example, may be the memory 1030. The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module. The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa. Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

The invention claimed is:

1. An electronic device comprising:
a display;
an image sensor including a first pixel subset having at least one pixel with a first sensitivity and a second pixel subset having at least one pixel with a second sensitivity; and
a processor to process image data generated through the image sensor,
wherein the processor is configured to:
obtain image data of an external subject through each of the first pixel subset and the second pixel subset;
identify attribute information of first sub-image data, which corresponds to the first pixel subset, and attribute information of second sub-image data, which corresponds to the second pixel subset, of the image data;
select the first sub-image data based on information on surrounding brightness of the electronic device and, if focus information corresponding to the external subject cannot be obtained for the first sub-image data, then select the second sub-image data, based at least on the attribute information of the first sub-image data and the attribute information of the second sub-image data;
obtain the focus information corresponding to the external subject using the first sub-image data or the second sub-image data;
generate third sub-image data using the second sub-image data to substitute data areas corresponding to the first sub-image data when the first sub-image data is selected; and
output, to the display, image data, which is obtained by synthesizing the second sub-image data and the third sub-image data.

2. The electronic device of claim 1, wherein the processor is further configured to:
identify exposure information of the first sub-image data and the second sub-image data, through at least a portion of an operation of identifying the attribute information; and
determine whether the exposure information satisfies a specified exposure condition.

3. The electronic device of claim 1, wherein the processor is further configured to:
compare the first sub-image data with the second sub-image data, and
select the first sub-image data based on the comparison result.

4. The electronic device of claim 1, further comprising:
another image sensor,
wherein the processor is further configured to:
determine the focus information as focus information of the another image sensor corresponding to the external subject.

5. The electronic device of claim 4, further comprising:
a display,
wherein the processor is further configured to:
obtain image data corresponding to the external subject through the another image sensor; and
display the obtained image data through the display.

6. The electronic device of claim 1, wherein the processor is further configured to:
set sensitivity of the first pixel subset to a third sensitivity; and
set sensitivity of the second pixel subset to a fourth sensitivity.

7. The electronic device of claim 1, wherein the first sub-image data and the second sub-image data are simultaneously set through the image sensor.

8. An electronic device comprising:
a display;
an image sensor including a plurality of pixels; and
a processor,
wherein the processor is configured to:
set a first pixel subset of the plurality of pixels to have a first sensitivity or a first exposure time;
set a second pixel subset of the plurality of pixels to have a second sensitivity or a second exposure time;
obtain image data of an external subject through the first pixel subset and the second pixel subset;
identify attribute information of first sub-image data, which corresponds to the first pixel subset, and attribute information of second sub-image data, which corresponds to the second pixel subset, of the image data;
select the first sub-image data based on information on surrounding brightness of the electronic device and, if focus information corresponding to the external subject cannot be obtained for the first sub-image data, then select the second sub-image data, based at least on the attribute information of the first sub-image data and the attribute information of the second sub-image data;
determine the focus information corresponding to the external subject using the first sub-image data or the second sub-image data;
generate third sub-image data using the second sub-image data to substitute data areas corresponding to the first sub-image data when the first sub-image data is selected; and
output, to the display, image data, which is obtained by synthesizing the second sub-image data and the third sub-image data.

9. A method for processing an image, which is executed in an electronic device including a processor and an image sensor including a first pixel subset having at least one pixel with a first sensitivity and a second pixel subset having at least one pixel with a second sensitivity, the method comprising:

obtaining, by using the processor, image data of a subject outside the electronic device through the image sensor;
identifying attribute information of first sub-image data, which corresponds to the first pixel subset, and attribute information of second sub-image data, which corresponds to the second pixel subset, of the image data;
selecting the first sub-image data based on information on surrounding brightness of the electronic device and, if focus information corresponding to the external subject cannot be obtained for the first sub-image data, then selecting the second sub-image data, based at least on the attribute information of the first sub-image data and the attribute information of the second sub-image data;
determining the focus information corresponding to the external subject using the first sub-image data or the second sub-image data;
generating third sub-image data using the second sub-image data to substitute data areas corresponding to the first sub-image data when the first sub-image data is selected; and
outputting, to the display, image data, which is obtained by synthesizing the second sub-image data and the third sub-image data.

10. The method of claim 9, further comprising:
setting sensitivity of the first pixel subset included in the image sensor to the first sensitivity or with a first exposure time; and
setting sensitivity of the second pixel subset included in the image sensor to the second sensitivity or with a second exposure time.

11. The method of claim 9, wherein identifying the attribute information further includes:
identifying exposure information of the first sub-image data and the second sub-image data; and
determining whether the exposure information satisfies a specified exposure condition.

12. The method of claim 9, further comprising:
determining the focus information as focus information of another image sensor, which corresponds to the external subject, included in the electronic device.

* * * * *